US006508471B1

United States Patent
Blau

(10) Patent No.: US 6,508,471 B1
(45) Date of Patent: Jan. 21, 2003

(54) GASKET WITH MOLDED-IN BOLT RETENTION MEANS

(75) Inventor: Andrew P. Blau, Richmond Heights, OH (US)

(73) Assignee: Shiloh Industries, Inc., Cleveland, OH (US)

( * ) Notice: Subject to any disclaimer, the term of this patent is extended or adjusted under 35 U.S.C. 154(b) by 0 days.

(21) Appl. No.: 09/479,121

(22) Filed: Jan. 7, 2000

Related U.S. Application Data
(60) Provisional application No. 60/115,050, filed on Jan. 8, 1999, and provisional application No. 60/115,212, filed on Jan. 8, 1999.

(51) Int. Cl.[7] .............................. F16J 15/06; F02F 11/00
(52) U.S. Cl. ........................................ 277/313; 277/598
(58) Field of Search ................... 277/591, 598, 277/313

(56) References Cited

U.S. PATENT DOCUMENTS

| | | | |
|---|---|---|---|
| 3,948,532 A | 4/1976 | Hopp | |
| 4,693,248 A | 9/1987 | Fialla | 128/334 |
| 4,730,836 A * | 3/1988 | Miller et al. | |
| 4,756,561 A | 7/1988 | Kawata | 285/187 |
| 4,784,396 A | 11/1988 | Scott et al. | |
| 4,828,442 A | 5/1989 | Duran | 411/353 |
| 4,913,101 A | 4/1990 | Sliger | 123/41.1 |
| 4,982,704 A | 1/1991 | Sliger | 123/41.1 |
| 5,011,192 A | 4/1991 | Campo | 285/23 |
| 5,083,801 A | 1/1992 | Okano | |
| 5,096,325 A | 3/1992 | Udagawa | 403/13 |
| 5,259,629 A | 11/1993 | Udagawa | |
| 5,513,855 A * | 5/1996 | Yasui | |
| 5,544,902 A | 8/1996 | Belter | |
| 5,551,702 A * | 9/1996 | Inamura | |
| 5,586,770 A * | 12/1996 | Udagawa et al. | |
| 5,673,920 A | 10/1997 | Mockenhaupt | |
| 5,791,660 A | 8/1998 | Belter | 277/598 |
| 6,039,323 A * | 3/2000 | Mockenhaupt et al. | |
| 6,179,298 B1 * | 1/2001 | Schweiger | |
| 6,193,237 B1 * | 2/2001 | Schweiger et al. | |

* cited by examiner

*Primary Examiner*—Anthony Knight
*Assistant Examiner*—John L. Beres
(74) *Attorney, Agent, or Firm*—Daniel A. Thomson; Roger D. Emerson; Emerson & Skeriotis (57) ABSTRACT

A method and apparatus for a gasket with a molded-in bolt retention means is herein provided. The apparatus includes a gasket carrier encased in a silicone rubber gasket, with the gasket carrier containing a series of holes. The holes in the gasket carrier are preferably in a star-shape and secure the bolt in place when the bolt is pressed through the opening. The method of assembling the gasket is also provided, the method including the steps of encasing the gasket carrier within the gasket, attaching an associated cover to the gasket, sliding the associated bolt through the various openings, and securing the bolt in place.

10 Claims, 11 Drawing Sheets

GASKET WITH MOLDED-IN BOLT RETENTION MEANS

This application claims priority to U.S. Provisional Patent Application Ser. No. 60/115,050, entitled GASKET WITH MOLDED-IN BOLT RETENTION MEANS, filed on Jan. 8, 1999 and U.S. Provisional Patent Application Ser. No. 60/115,212, entitled GASKET WITH MOLDED-IN BOLT RETENTION MEANS, filed on Jan. 8, 1999.

I. BACKGROUND OF THE INVENTION

A. Field of the Invention

This invention pertains to the art of methods and apparatuses for retaining and securing bolts.

B. Description of the Related Art

It is well known in the art to use a silicone rubber gasket as an elastically deformable barrier. For example, a valve cover gasket is used between a valve cover and an engine block. However, the assembly requires the steps of placing the valve cover gasket onto the engine block and the valve cover on top of it, then placing the bolts through the holes and securing the valve cover to the engine block. The current invention enables the assembler of the product to have the bolts securely fastened in the valve cover and valve cover gasket, before application to the engine block. In the previous art, the valve cover gasket simply had a hole permitting the bolt to pass through. The valve cover gasket was placed against the valve cover and the bolts were pushed through. The current invention allows the valve cover gasket and valve cover to be assembled beforehand, with the bolts fastening the valve cover and valve cover gasket together. For the purposes of this disclosure, the combination of a valve cover gasket and a valve cover, assembled together beforehand, will be referred to as the valve cover/valve cover gasket unit.

The valve cover/valve cover gasket unit can be assembled prior to being shipped to the automotive plant, and the bolts will be in a secure position, and will not become dislodged during shipping. Once the automotive plant receives the unit, they can simply place the unit onto the engine block and secure the bolts.

One known type of bolt retention is described in U.S. Pat. No. 5,544,902 to Belter. The Belter patent describes a metal gasket for sealing two metal surfaces together, wherein one of the apertures has a first inner diameter larger than the major diameter with a plurality of retainer tabs extending radially inwardly. However, the Belter patent does not disclose the use of nonmetallic materials or the use of a gasket carrier in conjunction with the gasket.

Another known bolt retaining device is described in U.S. Pat. No. 5,673,920 to Mockenhaupt. The Mockenhaupt patent describes a gasket having a bolt hole with one or more spaced beams which engage and grip a bolt and which resist removal of the bolt. However, the Mockenhaupt patent does not disclose the use of a gasket carrier with the gasket or the use of inwardly extending teeth.

The present invention contemplates a new and improved bolt retention device, which is simple in design, effective in use, and overcomes the foregoing difficulties and others while providing better and more advantageous overall results.

II. SUMMARY OF THE INVENTION

In accordance with one aspect of the present invention, a new and improved bolt retention system includes a gasket carrier, the gasket carrier having multiple gasket carrier flanges, each flange having a second opening, the second opening, the second opening having a third diameter and inwardly facing teeth, the teeth having a first height, the gasket carrier being made of nylon, a gasket, the gasket having multiple flanges, each flange having a first opening, the gasket being made of rubber, the gasket enveloping the gasket carrier, the first and second openings being substantially aligned, and a bolt, the bolt having a first diameter and threads, the threads having a second diameter, the third diameter being less than the first diameter, the first height being less than the second diameter.

In accordance with another aspect of the current invention, the invention includes a gasket, the gasket having at least one first opening, a gasket carrier, the gasket carrier having at least one second opening, the at least one second opening having a third diameter, and connecting means for connecting the gasket, the gasket carrier and the associated cover, the connecting means having a first diameter, the third diameter being less than the first diameter.

In accordance with still another aspect of the current invention, the connecting means has threads, the threads having a second diameter, the first height being less than the second diameter, and the gasket envelopes the gasket carrier.

According to yet another aspect of the current invention, a method for retaining connecting means includes the steps of providing the connecting means, the connecting means having a first diameter, providing a gasket, the gasket having at least one first opening, providing a gasket carrier, the gasket carrier having at least one second opening, the second opening having a third diameter, the gasket carrier being elastically deformable, the third diameter being less than the first diameter, inserting the connecting means into the at least one first opening, and moving the connecting means through the at least one first opening and through the at least one second opening.

One advantage of the current invention is the significant increase in speed of the assembly.

Another advantage of the current invention is that the valve cover and valve cover gasket can be preassembled.

Still another advantage of the current invention is that process of assembling the gasket and bolts takes place in one pass.

Still other benefits and advantages of the invention will become apparent to those skilled in the art to which it pertains upon a reading and understanding of the following detailed specification.

III. BRIEF DESCRIPTION OF THE DRAWINGS

The invention may take physical form in certain parts and arrangement of parts. Multiple embodiments of these parts will be described in detail in the specification and illustrated in the accompanying drawings, which form a part of hereof and wherein.

IV. DESCRIPTION OF THE PREFERRED EMBODIMENT

Figure 1:
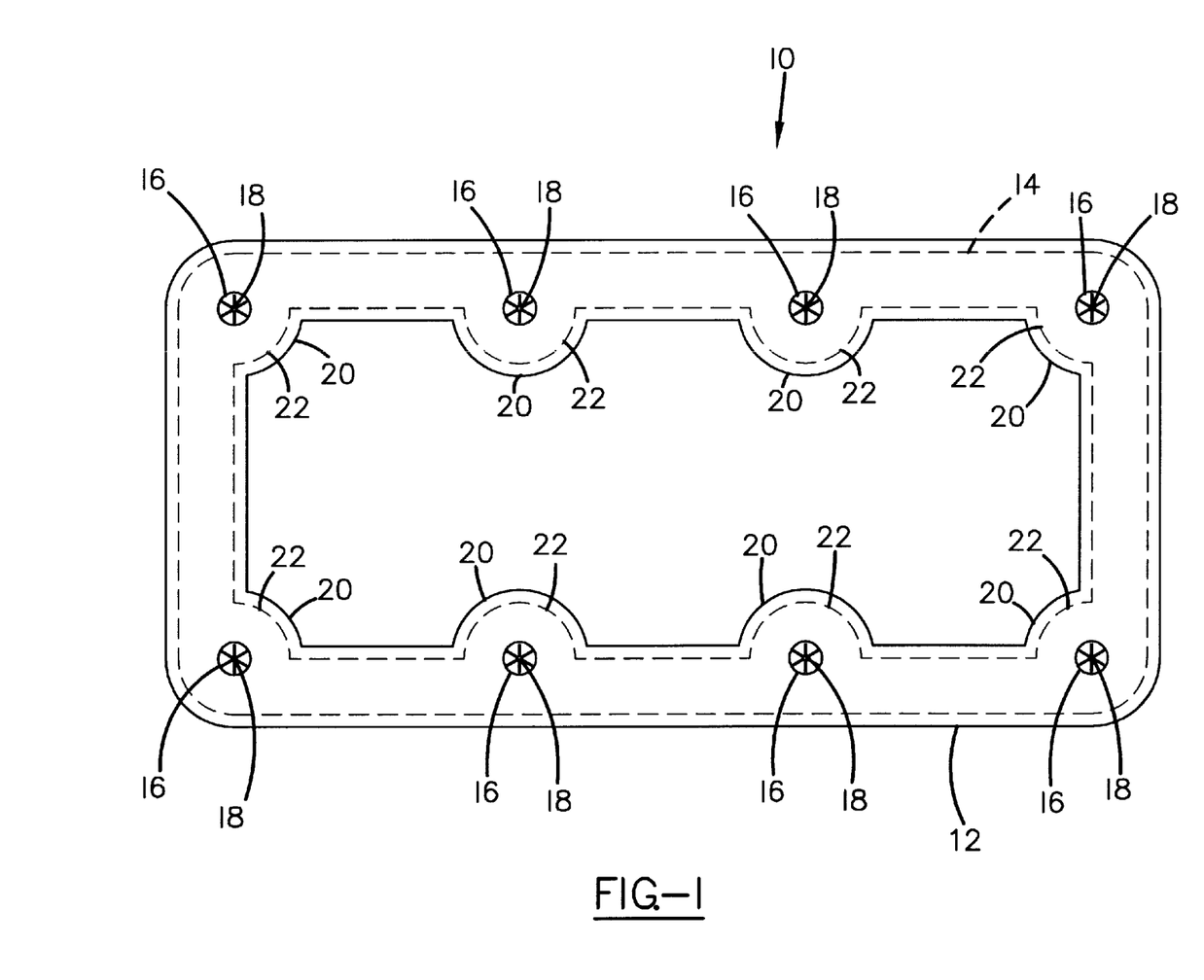
FIG. 1 is a top view of the gasket assembly showing the gasket, the gasket carrier, the first and second openings, the gasket flanges, and the gasket carrier flanges.

Referring now to the drawings, which are for purposes of illustrating an embodiment of the invention only, and not for purposes of limiting the same, FIG. 1 shows a top view of an inventive gasket assembly 10. The gasket assembly 10 includes a gasket 12 and a gasket carrier 14. The gasket carrier 14 is enveloped by the gasket 12. In this embodiment, the gasket 12 is made of silicone rubber, and the gasket carrier 14 is made of a glass filled nylon or aluminum. The gasket 12 and the gasket carrier 14, however, can be made of any material chosen using sound engineering judgment, and as long as the material is elastically deformable. By "elastically deformable," it is meant that the material substantially retains its original shape after being deformed. FIG. 1 shows first and second openings 16, 18, as well as gasket flanges 20 and gasket carrier flanges 22.

Figure 2:
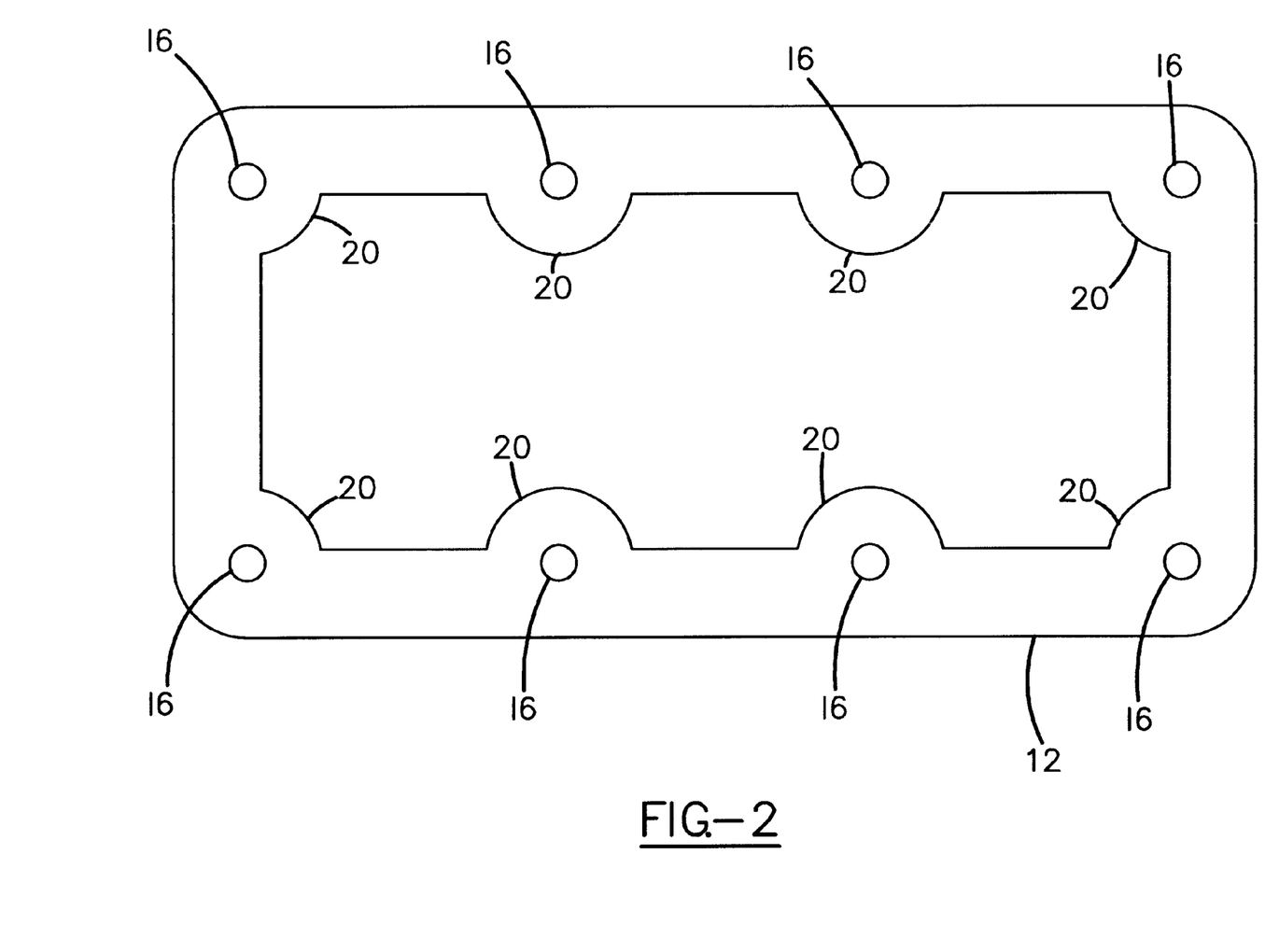
FIG. 2 is a top view of the gasket showing the gasket flanges and the first openings.
Figure 3:
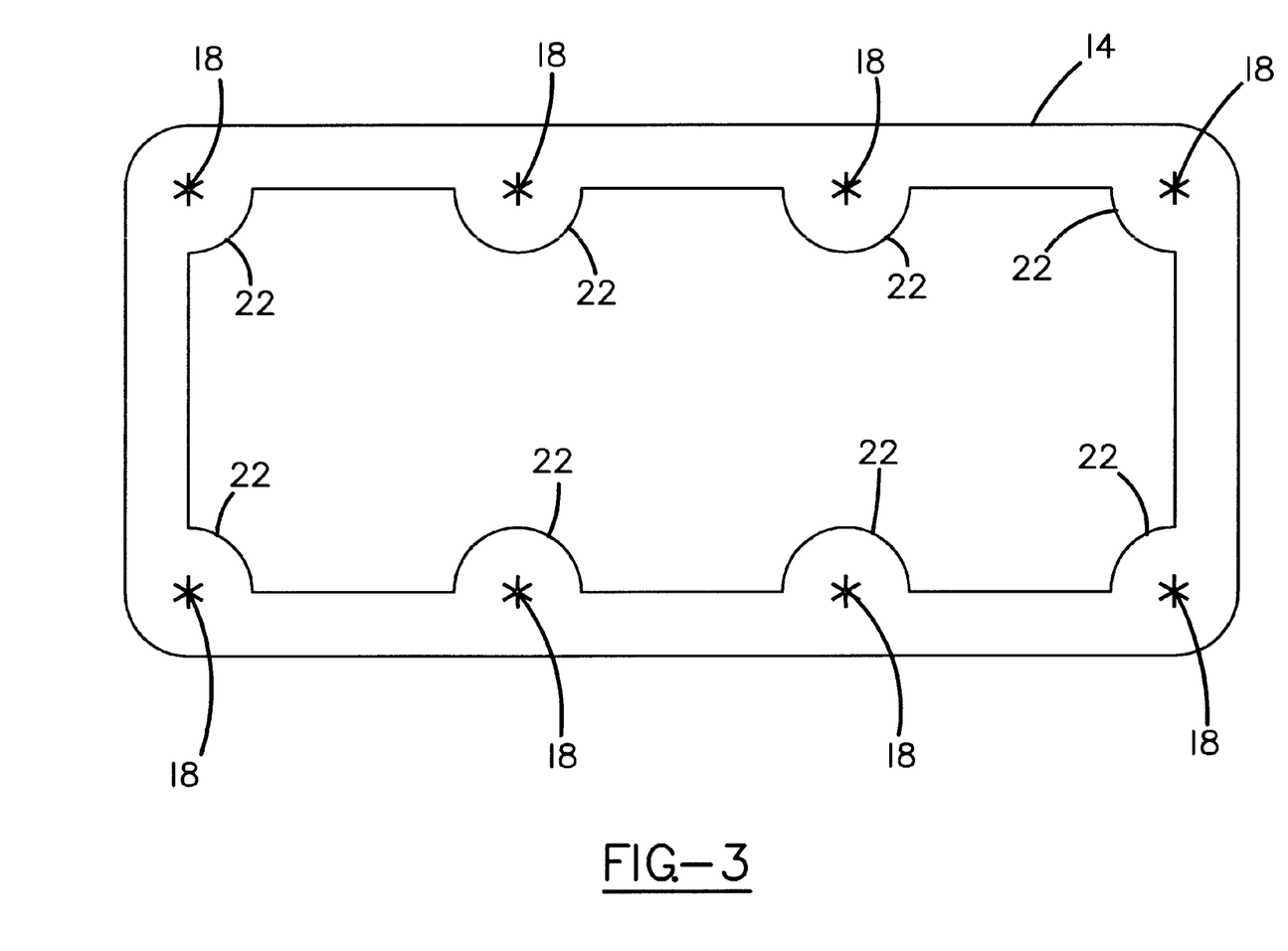
FIG. 3 is a top view of the gasket carrier showing the gasket carrier flanges and the second openings.
Figure 5:
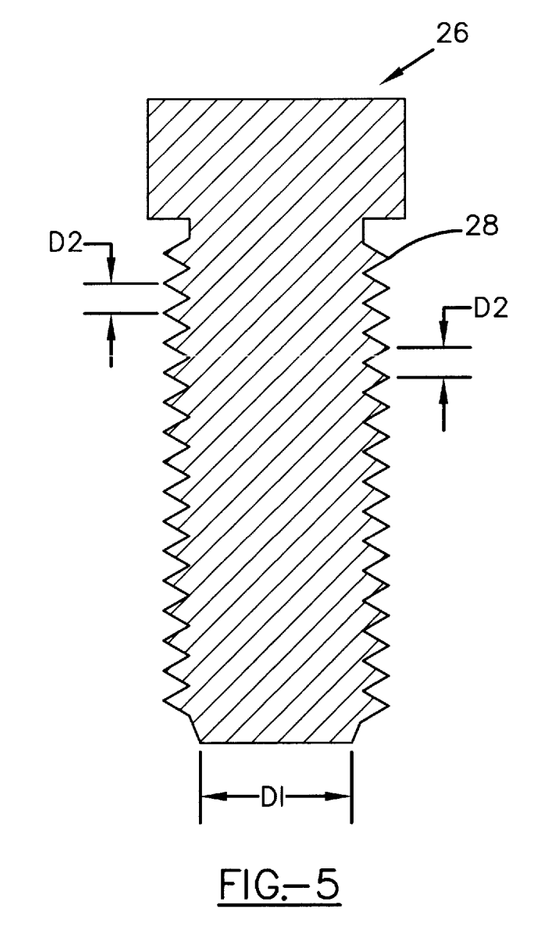
FIG. 5 is an elevation view of a bolt showing first and second diameters and the bolt threads.
Figure 7:
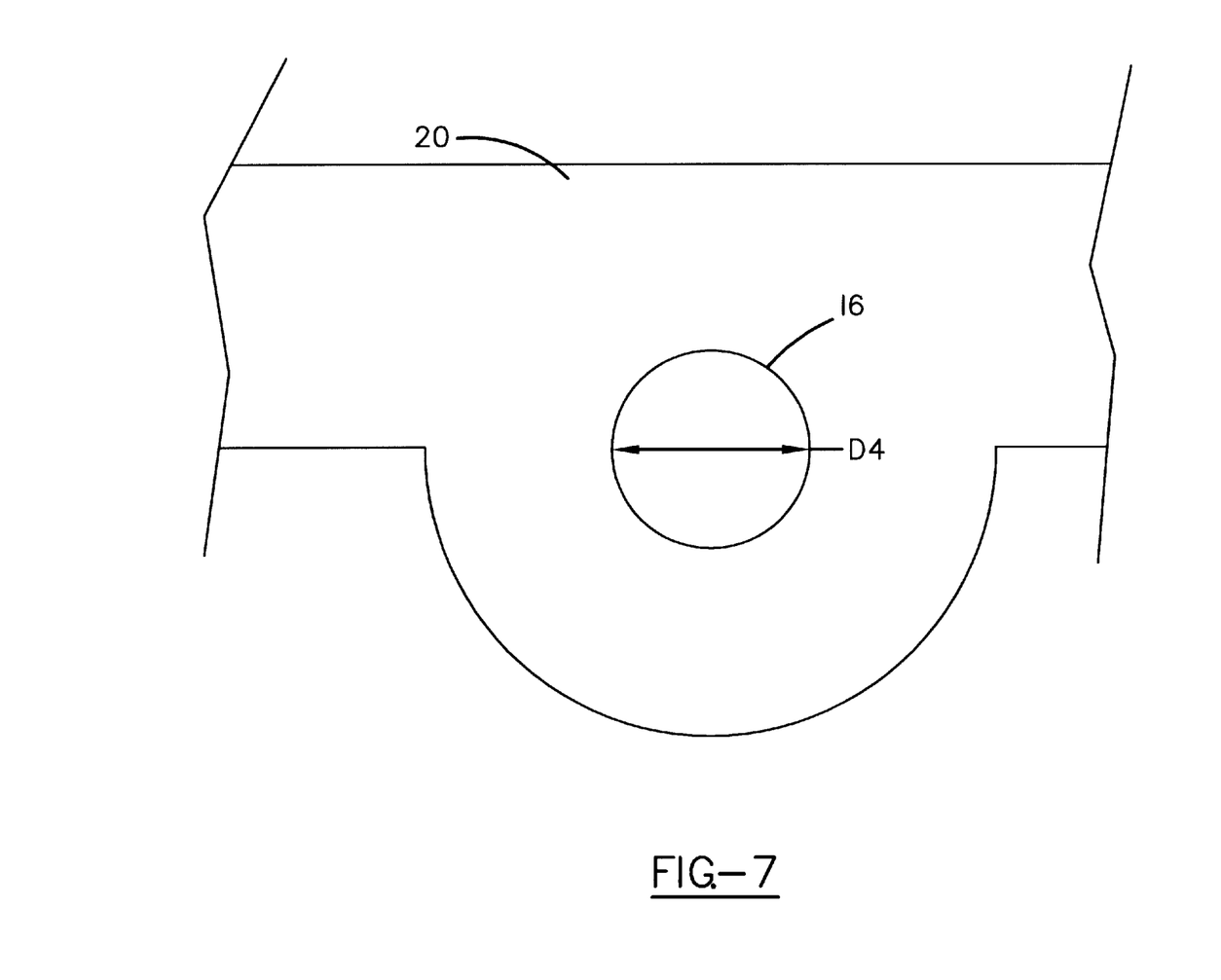
FIG. 7 is a close-up top view of a gasket flange showing a first opening with a fourth diameter.

With reference now to FIGS. 2, 5, and 7, the gasket 12 has several gasket flanges 20, and within each gasket flange 20 includes a first opening 16. FIG. 5 shows a bolt 26 having threads 28. As shown, the bolt 26 has a second diameter D2 between the outer edges of successive threads 28. The first opening 16 is for receiving the bolt 26. The first opening 16, in this embodiment, is a circular hole with a fourth diameter D4 that is larger than a first diameter D1 of the bolt 26.

Figure 4:
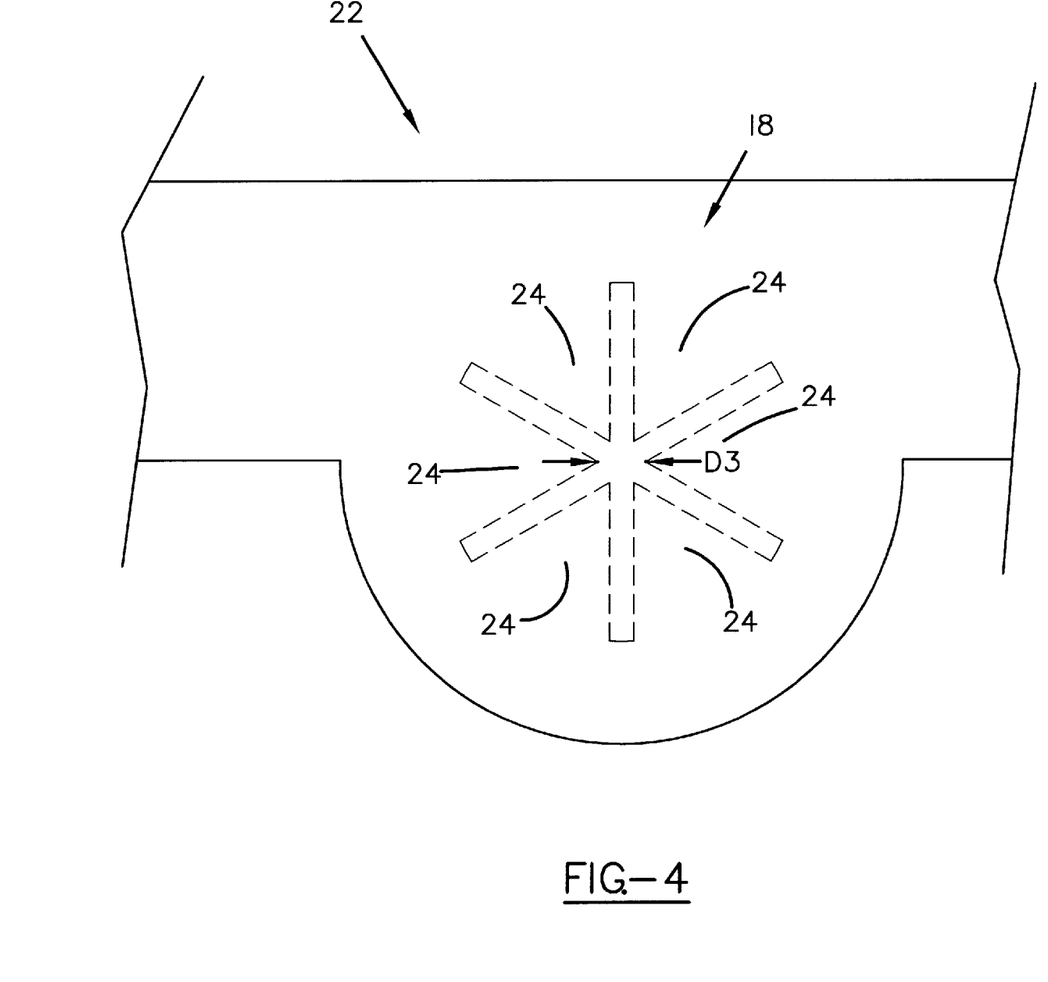
FIG. 4 is a close-up top view of a gasket carrier flange showing the second opening and the teeth of the second opening.

Now, with reference to FIGS. 1, 4, and 5, the gasket carrier 14 has gasket carrier flanges 22, and second openings 18. As shown, the gasket carrier flanges 22 are positioned with respect to the gasket flanges 20 such that the second openings 18 are substantially coaxial with the first openings 16. The gasket carrier 14 is preferably made of an elastically deformable material, so that when the second opening 18 receives the bolt 26, the second opening 18 secures the bolt 26 in place. FIG. 4 shows a close-up of one of the second openings 18 in the gasket carrier flange 22. The second opening 18 is preferably formed by cutting at least one slit into the carrier flange 22. More preferably at least two intersecting slits are used to form the second opening 18. Most preferably, as shown in FIG. 4, at least three slits are used to form the "star" shaped second opening 18. When multiple intersecting slits are made, a plurality of teeth 24 are formed in the carrier flange 22 material. Each tooth 24, referring also to FIG. 6, has a front edge 30 that is narrower than a base 32.

Figure 6:
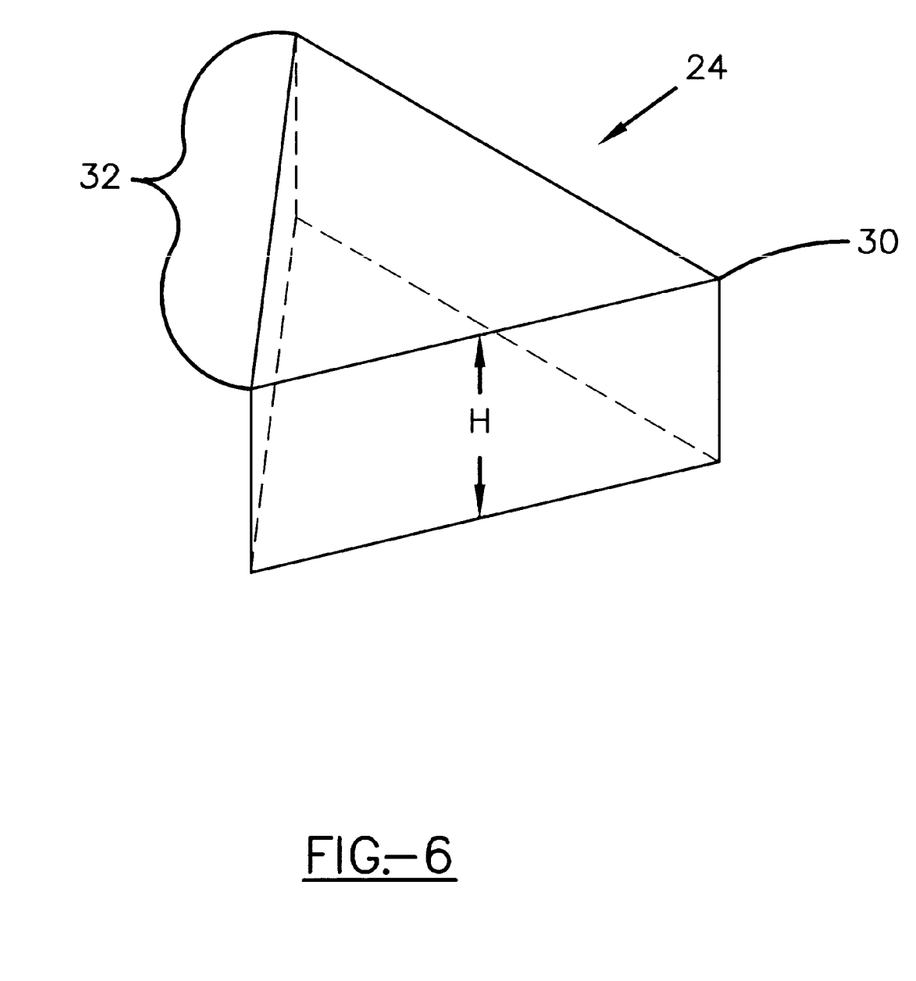
FIG. 6 is a close-up perspective view of one of the inwardly extending teeth showing the first height.

Still referring to FIGS. 4 and 6, as shown, each front edge 30 faces or points toward an opposite front edge 30 of another tooth 24. The opposite front edges 30, 30 may be spaced by a third diameter D3. It is not required, however, for there to be any space between the front edges 30 of the teeth 24. It is possible for the front edges 30 of the teeth 24 to be in contact. Preferably, the third diameter D3 is smaller than the first diameter D1 of the bolt 26. The teeth 24, as shown in FIG. 6, may have a first height H1. Preferably the first height H1 is less than the second diameter D2 between the outer edges of successive threads 28 for reasons to be discussed below. The teeth 24 are preferably each elastically deformable about the bolt 26 as the bolt 26 is inserted into the second opening 18. (It is contemplated within this invention that the gasket 12 and the gasket carrier not be elastically deformable, as long as the teeth 24 are elastically deformable). Since the base 32 of each tooth 24 is wider than the front edge 30, the teeth 24 are more elastically deformable at the front edge 30. In addition, the width of the base 32 provides strength at the base 32 of the teeth 24.

Figure 11:
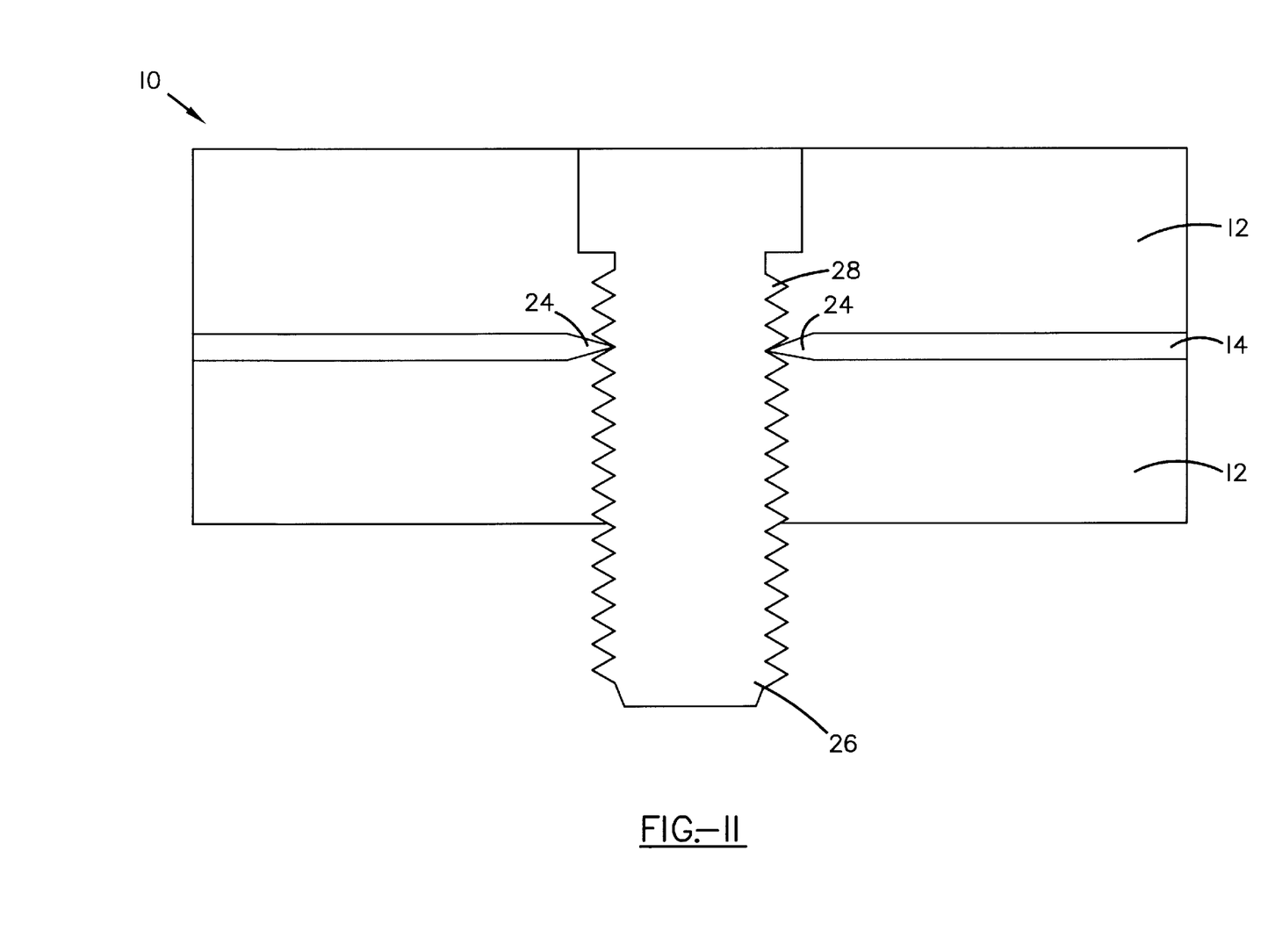

With reference now to FIGS. 1–7, and 11 the preparation of the gasket assembly 10 will now be described. An associated valve cover (not shown) is placed on to the gasket assembly 10, and the required number of bolts 26 are inserted through openings in the associated valve cover and then through the first and second openings 16, 18. Relatively little pressure is required in order to push the bolt 26 past the teeth 24 that accompany the second opening 18. Once the bolt 26 has been sufficiently positioned, the teeth 24 come to rest between the outer edges of successive threads 28 on the bolt 26 thereby securing the bolt 26 in place for shipping. It should be noted that the inventive configuration of the teeth 24 allows for passage of the bolt 26 through the second opening 18, without any damage to the structure of the teeth 24. FIG. 11 shows the bolt 26 after it has been inserted into the gasket assembly 10.

Figure 8:
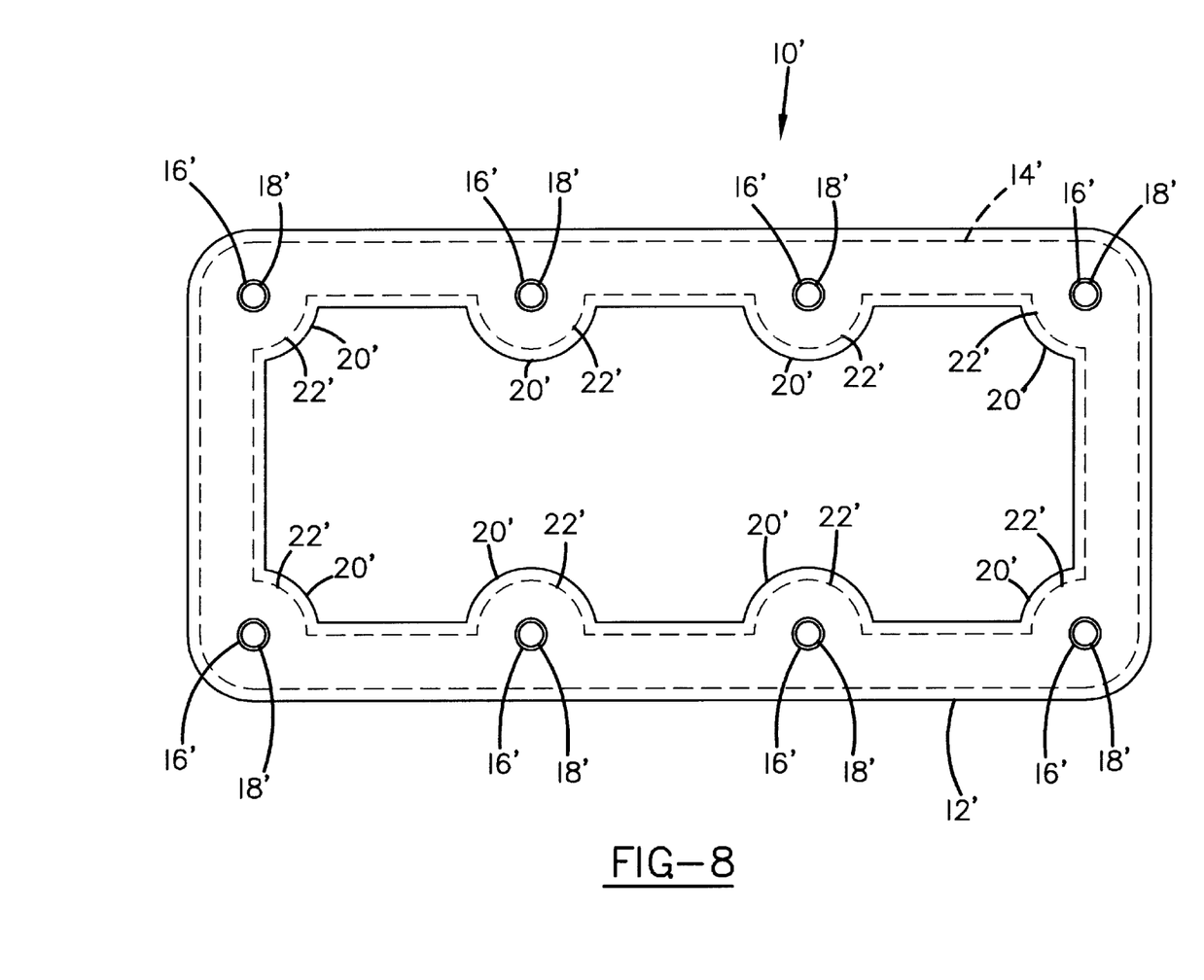
FIG. 8 is a top view of a second embodiment of the gasket assembly showing the gasket, the gasket carrier, the first and second openings, the gasket flanges, and the gasket carrier flanges.
Figure 9:
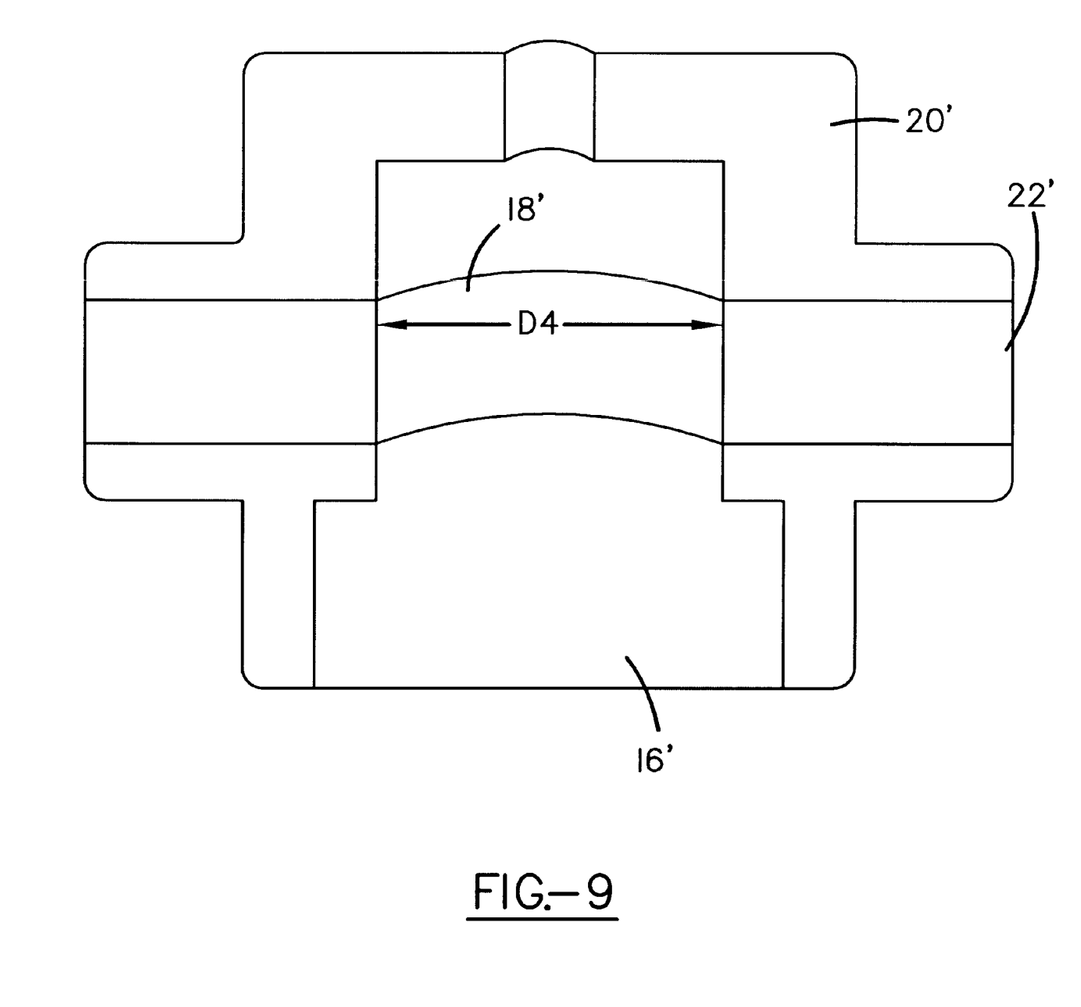
FIG. 9 is a cross-sectional view of the second embodiment of the gasket assembly showing the first opening and the fourth diameter.
Figure 10:
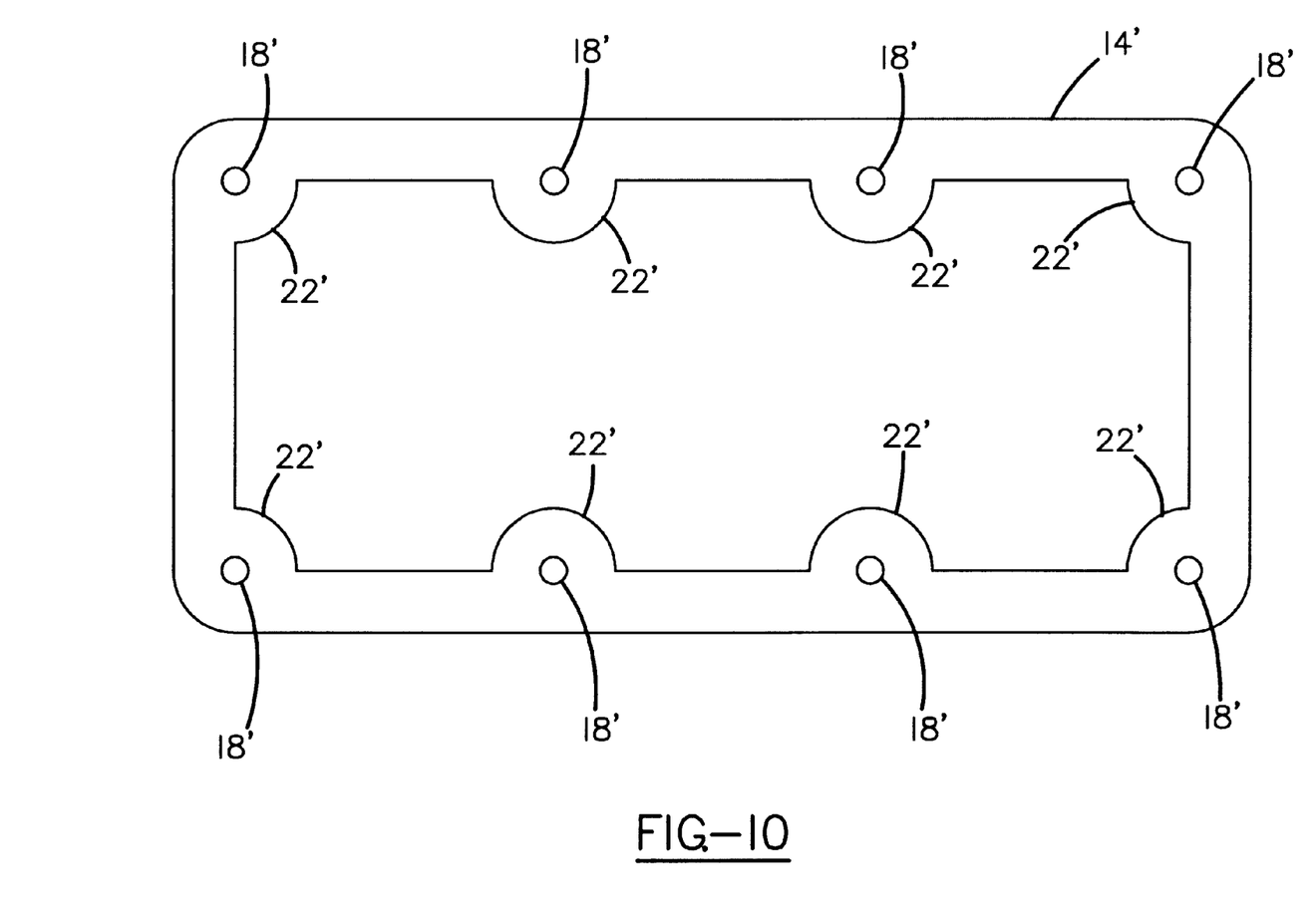
FIG. 10 is a top view of the second embodiment of the gasket carrier, showing the second opening and the gasket carrier flanges; and, FIG. 11 is a cross-sectional view of the bolt being retained by the gasket carrier.

Referring now to FIGS. 8–10, which are for purposes of illustrating a second embodiment of the invention only, and not for purposes of limiting the same, FIG. 8 shows a top view of an inventive gasket assembly 10'. The gasket assembly 10' includes a gasket 12' and a gasket carrier 14'. The gasket carrier 14' is enveloped by the gasket 12'. In this embodiment, the gasket 12' is made of silicone rubber, and the gasket carrier 14' is made of a glass filled nylon or aluminum. The gasket 12' and the gasket carrier 14' can be made of any material chosen using sound engineering judgment. The gasket assembly 10' also includes first and second openings 16', 18', gasket flanges 20', and gasket carrier flanges 22'.

The gasket carrier 14' has gasket carrier flanges 22', and second openings 18'. The gasket carrier flanges 22' are positioned with respect to the gasket flanges 20' such that the second openings 18' are substantially coaxial with the first openings 16'. The gasket carrier 14' is preferably made of an elastically deformable material, so that when the second opening 18' receives the bolt 26, the second opening 18' secures the bolt 26 in place. The second opening 18' has a fifth diameter D5. The fifth diameter D5 is less than the first diameter D1 of the bolt 26. This configuration allows the bolt 26 to be held in place via a press fit by the second opening 18'. The operation and procedure for this second embodiment is identical to the operation and procedure of the first embodiment.

The current invention has been described with regard to a valve cover and a valve cover gasket, however the current system would be applicable to any cast pan, stamped pan, or non-metallic pan detail. The current invention will work with oil pans, and any type of oil cover, including differential covers, transmission covers, valve covers, or the like.

The invention has been described with reference to the preferred embodiment. Obviously, modifications and alterations will occur to others upon a reading and understanding of the specification. It is intended by applicant to include all such modifications and alterations insofar as they come within the scope of the appended claims or the equivalents thereof.

I claim:

1. A bolt retention system for use with an associated valve cover, the bolt retention system comprising:
   a bolt, the bolt having a first diameter and threads, the threads having a second diameter;
   a gasket, the gasket having multiple flanges, each flange having a first opening, the gasket being made of rubber;
   a gasket carrier, the gasket carrier having multiple gasket carrier flanges, each flange having a second opening, the second opening having a third diameter and inwardly facing teeth, the teeth having a first height, the gasket carrier being made of nylon, the gasket enveloping the gasket carrier, the first and second openings being substantially aligned; and, wherein the third diameter is less than the first diameter, and the first height is less than the second diameter.

2. A retention system for use with an associated cover, the retention system comprising:
   a gasket, the gasket having at least one first opening;
   a gasket carrier, the gasket carrier having at least one second opening, the at least one second opening having a diameter D3; and,
   connecting means for connecting the gasket, the gasket carrier, and the associated cover, the connecting means having a root diameter D1, the diameter D3 being less than the root diameter D1.

3. The retention system of claim 2, wherein the gasket and the gasket carrier are made of an elastically deformable material.

4. The retention system of claim 3, wherein the gasket is made of rubber and the gasket carrier is made of nylon.

5. The retention system of claim 3, wherein the at least one second opening has inwardly extending teeth, the teeth having a first height.

6. The retention system of claim 5, wherein the connecting means has threads, the threads having a second diameter, the first height being less than the second diameter.

7. The retention system of claim 2, wherein the gasket envelopes the gasket carrier.

8. A method for retaining connecting means, the method comprising the steps of:
   providing the connecting means, the connecting means having a root diameter D1;
   providing a gasket, the gasket having at least one first opening;
   providing a gasket carrier, the gasket carrier having at least one second opening, the second opening having a diameter D3, the gasket carrier being elastically deformable, the diameter D3 being less than the root diameter D1;
   inserting the connecting means into the at least one first opening; and,
   moving the connecting means through the at least one first opening and through the at least one second opening.

9. The method of claim 8, wherein before inserting the connecting means into the at least one first opening, the method comprises the step of:
   enveloping the gasket carrier within the gasket.

10. The method of claim 9, wherein the step of providing the connecting means, the connecting means threads having a second diameter, and wherein the step of providing a gasket carrier, the gasket carrier includes inwardly extending teeth, and wherein the step of moving the connecting means through the at least one first opening and through the at least one second opening thereby secures the teeth between the threads of the connecting means.

* * * * *